United States Patent Office 3,798,325
Patented Mar. 19, 1974

3,798,325
IMIDAZOLIDINONE DERIVATIVES AS CENTRAL NERVOUS SYSTEM DEPRESSANTS
Walter Schindler, Riehen, Basel-Land, and Armin Zuest, Birsfelden, Basel-Land, Switzerland, assignors to Ciba-Geigy Corporation, Ardsley, N.Y.
No Drawing. Original application Aug. 5, 1970, Ser. No. 61,435, now Patent No. 3,720,676. Divided and this application Dec. 21, 1972, Ser. No. 317,341
Claims priority, application Switzerland, Aug. 11, 1969, 12,120/69
Int. Cl. A61k 27/00
U.S. Cl. 424—250
4 Claims

ABSTRACT OF THE DISCLOSURE

Compounds of the class of 1-[2- and 3-[4-(10,11-dihydro-5H-dibenzo[a,d]cyclohepten - 10 - yl) - 1 - piperazinyl]-allyl] - 3 - alkyl - 2 - imidazolidinone which can be substituted in 8-position by chloro, methyl or methoxy, and the pharmaceutically acceptable acid addition salts thereof, have a depressant effect on the central nervous system; pharmaceutical compositions comprising these compounds and a method of producing a depressant effect on the central nervous system of warm-blooded animals, are provided; an illustrative embodiment is 1-[2-[4-(8-methyl-10,11-dihydro - 5H - dibenzo[a,d]cyclohepten-10-yl)-1-piperazinyl]-ethyl] - 3 - methyl - 2 - imidazolidinone-bis-maleate.

DETAILED DESCRIPTION

This is a division of application Ser. No. 61,435, filed Aug. 5, 1970, now U.S. Pat. 3,720,676. The present invention relates to new imidazolidinone derivatives, to processes for their production, to pharmaceutical compositions comprising the new compounds, and to the use thereof.

More particularly, the invention relates to compounds of Formula I,

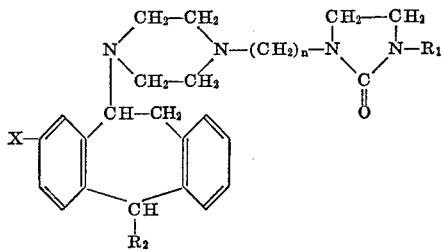

wherein

X is hydrogen, chloro, methyl or methoxy;
$R_1$ is alkyl having one to four carbon atoms;
$R_2$ is hydrogen or methyl; and
$n$ is the integer 2 or 3;

and the pharmaceutically acceptable acid addition salts thereof.

It has now been found that such compounds, especially 1-[2-[4-(8-methyl - 10,11 - dihydro - 5H - dibenzo[a,d] cyclohepten-10-yl) - 1 - piperazinyl]-ethyl]-3-methyl-2-imidazolidinone, and 1-[2-[4-(8-chloro - 10,11 - dihydro-5H-dibenzo[a,d]cyclohepten-10-yl) - 1 - piperazinyl]-ethyl]-3-methyl-2-imidazolidinone, as well as their pharmaceutically acceptable acid addition salts, possess valuable pharmacological properties, and a high therapeutic index. In the case of oral, rectal or parenteral administration, they have a central depressant action, e.g. they reduce motility, potentiate the effect of anaesthetics, have an antiemetic action, and have an inhibiting action in the "test de la traction." Furthermore, they have a sympathicolytic and serotonin-antagonistic action. These properties, which are determined by means of selected standard tests [cp. R. Domenjoz and W. Theobald, Arch. Int. Pharmacodyn. 120, 450 (1959) and W. Theobald et al., Arzneimittelforsch. 17, 561 (1967)], characterize the compounds as being suitable for the treatment of states of tension and agitation of different genesis.

In the compounds of Formula I, as alkyl group having one to four carbon atoms, $R_1$ can be the methyl, ethyl, propyl, isopropyl, butyl, isobutyl, sec.butyl or the tert. butyl group.

A compound of Formula I is produced according to the invention by reacting a compound of Formula II,

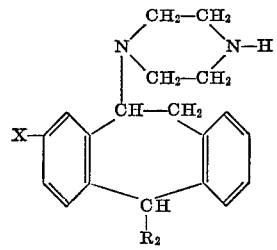

wherein X and $R_2$ have the meaning given under Formula I, or an alkali metal derivative of such a compound, with a reactive ester of a compound of Formula III,

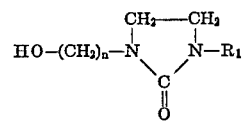

wherein $R_1$ and $n$ have the meaning given under Formula I; and, optionally, converting the reaction product with an inorganic or organic acid into an addition salt.

Suitable reactive esters of compounds of Formula III are, e.g. halides, such as chlorides or bromides, also sulphonic acid esters, e.g. the methanesulphonic acid ester, or the o- or p-toluenesulphonic acid ester.

These esters are reacted with the free bases II preferably in the presence of a solvent. Suitable solvents are those which are inert under the reaction conditions, e.g. hydrocarbons such as benzene, toluene or xylene; halogenated hydrocarbons such as chloroform; ethereal liquids such as ether or dioxane; as well as lower alkanones such as acetone, methyl ethyl ketone or diethyl ketone. The reaction temperatures are between ca. 50° and 150°, preferably at the boiling point of the applied solvent.

In the reaction according to the invention of one molecular equivalent of reaction ester with one molecular equivalent of free base, one molecular equivalent of acid is split off. This acid can be bound to excess base of Formula II, or to the dibasic reaction product. An acid-binding agent is, however, preferably added to the reaction mixture. Suitable acid-binding agents are, e.g. alkali metal carbonates such as sodium or potassium carbonate, also tertiary organic bases such as, e.g. pyridine, triethylamine or N,N-diisopropylethylamine. Excess tertiary bases may also be used as solvent.

If in the reaction according to the invention is used, instead of the free base of Formula II, an alkali metal derivative thereof, e.g. a sodium, potassium or lithium derivative, then it is advantageous for the reaction to be performed in a hydrocarbon, e.g. in benzene or toluene.

The formation of the alkali metal derivatives of the first reactant is preferably performed in situ, e.g. by the addition of at least one molecular equivalent of alkali metal hydride, alkali metal amide, or of an alkali metal organic compound, when initially one molecular equivalent of free base is used. For example, sodium amide and lithium amide are used as alkali metal amides; sodium hydride as alkali metal hydrides; and phenyl lithium or butyl lithium as alkali metal organic compound.

Of the starting materials of Formula II, e.g 8-chloro-10 - [1-piperazinyl)-10,11-dihydro-5H-dibenzo[a,d]cycloheptene is described in the literature. 8-methyl-10-(1-piperazinyl) - 10,11 - dihydro - 5H - dibenzo[a,d]cycloheptene can be obtained by another process, e.g. as follows: Starting with 8-methyl-10-chloro-10,11-dihydro-5H-dibenzo[a,d]cycloheptene, this is condensed in benzene with 1-piperazinecarboxylic acid ethyl ester to 4-(8-methyl-10,11 - dihydro - 5H - dibenzo[a,d]cpclohepten-10-yl)-piperazine-1-carboxylic acid ethyl ester; the condensation product is subsequently hydrolysed and decarboxylated by heating with potassium hydroxide in ethanol. Further starting materials of Formula II can be produced analogously. The second reactant of the process according to the invention are the reactive esters of compounds of Formula III. Of these compounds, for example, 1-(2-chloroethyl)- and 1 - (3 - chloropropyl) - 3-methyl-2-imidazolidinone as well as 1-(2-chloroethyl)-3-butyl-2-imidazolidinone are known, and can be produced by various processes. Further compounds of this type can be produced analogously.

Using a second process according to the invention, compounds of Formula I, of which the symbol $n$ denotes 2, are obtained by reacting a compound of Formula II, wherein X and $R_2$ have the meaning given under Formula I, or an alkali metal derivative of such a compound, with a compound of Formula IV,

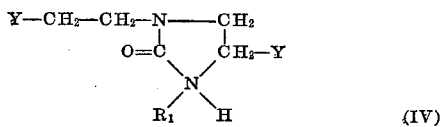

wherein

Y represents halogen, and $R_1$ has the meaning given under Formula I, or with an alkali metal derivative of such a compound; and, optionally, converting the reaction product with an inorganic or organic acid into an addition salt.

As halogen, the radical Y of Formula IV is preferably chlorine or bromine.

The reaction according to the invention of the free bases of Formula II, or of their alkali metal derivatives, with the urea derivatives, or their alkali metal derivatives, may be performed in the same solvents or diluents, and at the same reaction temperatures, as in the first process. In the reaction of one molecular equivalent of free base with one molecular equivalent of free urea derivative, two molecular equivalents of hydrogen halide are split off, which can also be bound to the same acid-binding agents. Both reactants are used as alkali metal derivatives, e.g. as sodium, potassium or lithium derivatives, preferably in situ, in the process according to the invention. These alkali metal derivatives can be obtained analogously to the alkali metal derivatives of the first process.

The production of the starting materials of Formula II is described following the first process. A starting material which is embraced by Formula IV is 1-methyl-3,3-bis-(2-chloroethyl)-urea which can be obtained, e.g. starting with diethanolamine. With 1-methylisocyanate, the diethanolamine yields 1 - methyl - 3,3-bis-(2-hydroxyethyl)-urea, which reacts with thionyl chloride, whereby sulphur dioxide and hydrogen chloride are split off. Further starting materials of Formula IV can be produced analogously.

Using a third process according to the invention, a reactive ester of a compound of Formula V,

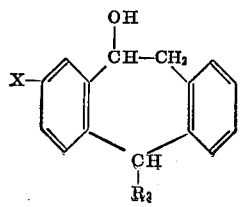

wherein X and $R_2$ have the meaning given under Formula I, is reacted with a compound of Formula VI,

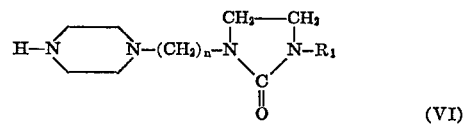

wherein $R_1$ and $n$ have the meaning given under Formula I, or with an alkali metal derivative of such a compound; and, optionally, the obtained reaction product is converted with an inorganic or organic acid into an addition salt.

Suitable reactive esters of compounds of Formula V are, e.g. halides, such as chlorides or bromides, also sulphonic acid esters such as methane-sulphonic acid ester, o- or p-toluenesulphonic acid ester, or o-chloro- or p-chlorobenzenesulphonic acid ester.

The reaction according to the invention of the free bases, or of their alkali metal derivatives, with the reactive esters can be performed in the same solvents or diluents, and at the same reaction temperatures, as in the first process. With the reaction of one molecular equivalent of free base with one molecular equivalent of reactive ester, one molecular equivalent of acid is split off, which can be bound to the same acid-binding agents as in the first process.

Instead of the free bases, it is also possible to use their alkali metal derivatives, e.g. sodium, potassium or lithium derivatives, preferably in situ, in the process according to the invention. These alkali metal derivatives can be obtained analogously to the alkali metal derivatives in the first process.

Starting materials: reactive esters of compounds of Formula V, e.g. 8,10 - dihydro - 5H - dibenzo[a,d]cycloheptene, 8-methyl- or 8-methoxy-10-chloro-10,11-dihydro-5H-dibenzo[a,d]cycloheptene, are described in the literature. Further starting materials of this type can be produced analogously.

Furthermore, as representative of compounds of Formula VI are known, e.g. 1-[2-(1-piperazinyl)-ethyl]-3-methyl-2-imidazolidinone, 1-[3 - (1 - piperazinyl)-propyl]-3-methyl-2-imidazolidinone, as well as the corresponding 3-ethyl-compounds; they can be produced by various methods. Further compounds of this type can be obtained analogously.

The compounds of Formula I obtained using a process according to the invention are, optionally, subsequently converted, in the usual maner, into their addition salts with inorganic an organic acids. For example, to a solution of a compound of Formula I in an organic solvent is added the acid desired as salt component, or a solution of the acid. Preferably chosen for the reaction are organic solvents in which the formed salt is difficultly soluble, so that it can be separated by filtration. Such solvents are, e.g. methanol, acetone, methyl ethyl ketone, acetone/ethanol, methanol/ether or ethanol/ether.

It is possible to use as medicaments, instead of free bases, pharmaceutically acceptable acid addition salts, i.e. salts with such acids of which the anions are not toxic in the case of the dosage amounts in question. It is moreover of advantage if the salts to be used as medicaments crystallize well and are not, or only slightly, hygroscopic. For salt formation with compounds of Formula I it is possible to use, e.g. hydrochloric acid, hydrobromic acid, sulphuric acid, phosphoric acid, methanesulphonic acid, ethanesulphonic acid, 2-hydroxyethanesulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid.

As previously mentioned, the new active substances are administered orally, rectally or parenterally. The dosage depends on the manner of administration, on the species, on the age, and on the individual condition. The daily dosages of the free bases, or of pharmaceutically acceptable salts thereof, vary between 0.15 mg./kg. and 10.5 mg./kg. for warm-blooded animals. Suitable dosage units such as dragées, tablets, suppositories or ampoules, preferably contain 5–200 mg. of an active substance according to the invention.

Dosage units for oral administration contains as active substance preferably between 10 and 90% of a compound of Formula I or of a pharmaceutically acceptable salt thereof. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragée cores. The dragée cores are coated, e.g. with concentrated sugar solutions which can also contain, e.g. gum arabic, talcum and/or titanium dioxide; or with a lacquer dissolved in readily volatile organic solvents or mixtures of solvents. Dyestuffs can be added to these coatings, e.g. to distinguish between varying dosages of active substance.

Further dosage units suitable for oral administration are hard gelatine capsules, as well as soft closed capsules made from gelatine and a softener, such as glycerin. The hard capsules preferably contain the active substance as a granulate, e.g. in admixture with fillers such as maize starch, and/or lubricants such as talcum or magnesium stearate, and optionally stabilizers such as sodium metabisulphite ($Na_2S_2O_5$) or ascorbic acid. In soft capsules, the active substance is preferably dissolved or suspended in suitable liquids such as liquid polyethylene glycols, whereby stabilizers may also be added.

Suitable dosage units for rectal administration are, e.g. suppositories consisting of a combination of an active substance with a suppository base material. Suitable suppository base materials are, e.g. natural or synthetic triglycerides, paraffin hydrocarbons, polyethylene glycols, or higher alkanols. Also suitable are gelatine rectal capsules consisting of a combination of the active substance with a base material. Suitable as a base material are, e.g. liquid triglycerides, polyethylene glycols, or paraffin hydrocarbons.

Ampoules for parenteral administration, especially intramuscular administration, preferably contain a water-soluble salt of an active substance in a concentration of preferably 0.5–5%, optionally together with suitable stabilizers and buffer substances, in aqueous solution.

The following prescriptions further illustrate the production of tablets, dragées, capsules, suppositories and ampoules:

(a) 250 g. of 1-[2-[4-(8-methyl-10,11-dihydro-5H-dibenzo[a,d]cyclohepten - 10 - yl)-1-piperazinyl]-ethyl]-3-methyl-2-imidazolidinone are mixed with 175.80 g. of lactose and 169.70 g. of potato starch; the mixture is then moistened with an alcoholic solution of 10 g. of stearic acid, and graulated through a sieve. After the granulate has dried, 160 g. of potato starch, 200 g. of talcum, 2.50 g. of magnesium stearate and 32 g. of colloidal silicon dioxide are mixed in; the mixture is then pressed into 10,000 tablets each weighing 100 mg. and each containing 25 mg. of active substance. These tablets can, if required be provided with grooves for a more precise adjustment of the dosage amount.

(b) A granulate is produced fro 250 g. of 1-[2-[4-(8-chloro - 10,11 - dihydro-5H-dibenzo[a,d]cyclohepten-10-yl) - 1 - piperazinyl]-ethyl]-3-methyl-2-imidazolidinone, 175.90 g. of lactose and the alcoholic solution of 10 g. of stearic acid. After the granulate has been dried, it is mixed with 56.60 g. of colloidal silicon dioxide, 165 g. of talcum, 20 g. of potato starch and 2.50 g. of magnesium stearate; the mixture is then pressed into 10,000 dragée cores. These are subsequently coated with a concentrated syrup made from 502.28 g. of crystallized saccharose, 6 g. of shellac, 10 g. of gum arabic, 0.22 g. of dyestuff, and 1.5 g. of titanium dioxide; and dried. The obtained dragées each weigh 120 mg. and each contain 25 mg. of active substance.

(c) To produce 1000 capsules each containing 25 mg. of active substance, 25 g. of 1-[2-[4-(8 - chloro - 10,11-dihydro - 5H - dibenzo[a,d]cyclohepten-10-yl]-1-piperazinyl]-ethyl]3-methyl-2-imidazolidinone are mixed with 248 g. of lactose; the mixture is then evenly moistened with an aqueous solution of 2.0 g. of gelatine, and granulated through a suitable sieve (e.g. sieve III, Ph. Helv. V). The granulate is mixed with 10.0 g. of dried maize starch and 15.0 g. of talcum; it is then evenly filled into 1000 hard gelatine capsules, size 1.

(d) A suppository foundation mixture is prepared from 2.5 g. of 1-[2-[4-(8-methyl-10,11-dihydro-5H-dibenzo-[a,d]cyclohepten - 10-yl)-1-piperazinyl]-ethyl]-3-methyl-2-imidazolidinone and 167.5 g. of adeps solidus; from this mixture are poured 100 suppositories each containing 25 mg. of active substance.

(e) A solution of 25 g. of 1-[2-[4-(8-methyl-10,11-dihydro - 5H-dibenzo[a,d]cyclohepten-10-yl)-1-piperazinyl] ethyl]-3-methyl-2-imidazolidinone-dihydrochloride in one litre of water is filled into 1000 ampoules, and sterilized. An ampoule contains a 2.5% solution of 25 mg. of active substance.

The following examples further illustrate the production of the new compounds of Formula I, and of intermediate products not described hitherto; but these examples in no way limit the scope of the invention. The temperatures are given in degrees centigrade.

EXAMPLE 1

(a) A suspension of 11.7 g. (0.040 mole) of 8-methyl-10 - (1-piperazinyl)-10,11-dihydro-5H-dibenzo[a,d]cycloheptene, 8.46 g. (0.044 mole) of 1-(2-chloro-ethyl)-3-methyl-2-imidazolidinone and 11.0 g. (0.08 mole) of potassium carbonate in 80 ml. of diethyl ketone is refluxed for 24 hours. The reaction mixture is cooled and filtered off under suction; the precipitate is then washed with acetone, and the filtrate concentrated in vacuo. The residue is taken up in benzene and water, the aqueous phase separated, and the organic phase extracted with 1-n-methanesulphonic acid. The free base is precipitated with concentrated ammonia from the acid extract, and the crude base taken up in benzene. The benzene solution is washed with water, dried over magnesium sulphate, and concentrated by evaporation. The crystalline residue is recrystallized from a little ethyl acetate/petroleum ether, whereupon the pure 1 - [2-[4-(8-methyl-10,11-dihydro-5H-dibenzo[a,d]cyclohepten - 10 - yl)-1-piperazinyl]-ethyl]-3-methyl-2-imidazolidinone has a M.P. of 116–117°; yield 11.7 g., 70% of the theoretical value.

4.2 g. (0.01 mole) of the obtained free base are dissolved in 20 ml. of anhydrous ethyl acetate; to this solution is then added a solution of 2.32 g. (0.02 mole) of maleic acid in 10 ml. of anhydrous acetone. An amount of 50 ml. of abs. ether is added and the precipitated bis-maleate filtered off; it is subsequently washed with absolute ether, and dried in vacuo. After recrystallization from a little ethanol/ethyl acetate, the pure 1-[2-[4-(8-methyl-10,11-dihydro - 5H - dibenzo[a,d]cyclohepten-10-yl)-1-piperazinyl]-ethyl] - 3 - methyl-2-imidazolidinone-bis-maleate melts at 138–140°.

8-methyl-10-(1-piperazinyl) - 10,11 - dihydro-5H-dibenzo[a,d]cycloheptene, required as starting material, can be produced as follows:

(b) To a solution of 12.1 g. (0.05 mole) of 8-methyl-10-chloro - 10,11 - dihydro-5H-dibenzo[a,d]cycloheptene in 80 ml. of benzene are added 23.7 g. (0.15 mole) of 1-piperazinecarboxylic acid ethyl ester; the solution is then refluxed for 24 hours. The reaction mixture is poured into 200 ml. of ice water; to this are added 25 ml. of 2-n sodium hydroxide solution, and the benzene phase is separated. The aqueous phase is shaken out with benzene; the organic phases are washed with water, dried over magnesium sulphate, the solvent is removed in vacuo, and the obtained crude residue further used.

(c) An amount of 12.9 g. of the crude product obtained according to (b) is dissolved in 50 ml. of abs. ethanol; to this solution are added 10 g. (0.15 mole) of potassium hydroxide, and the mixture is refluxed for 20 hours. The reaction solution is cooled and concentrated in vacuo; water is added to the residue and the base taken up in benzene. The benzene solution is washed with water until neutral, and the acid aqueous phase made alkaline with concentrated sodium hydroxide solution. The free base is extracted with benzene; the benzene solution is washed with water, dried over magnesium sulphate, and dried in vacuo. The crystalline residue is recrystallized from ethyl/ acetate/pentane. The pure 8-methyl-10-(1-piperazinyl)-10,11-dihydro-5H-dibenzo[a,d]cycloheptene melts at 95–96°; yield 4.4 g. 30% of the theoretical value; M.P. of the bis-methane sulphonate 194–196°.

EXAMPLE 2

(a) Analogously to Example 1 is obtained the following final product:
From 11.7 g. (0.040 mole) of 8-methyl-10-(1-piperazinyl)-10,11-dihydro - 5H - dibenzo[a,d]cycloheptene and 8.36 g. (0.044 mole) of 1-(3-chloropropyl)-3-ethyl-2-imidazolidinone is obtained: 1-[3-[4-(10,11-dihydro-5H-dibenzo[a,d]cyclohepten - 10 - yl)-1-piperazinyl]-propyl]-3-ethyl - 2 - imidazolidinone; M.P. of the bis-maleate, which is produced analogously to Example 1a, is 113–115°; yield 21.7 g.; 80% of the theoretical value.
The 1-(3-chloropropyl) - 3 - ethyl-2-imidazolidinone, required as starting material, is produced as follows:

(b) An amount of 15.6 g. (0.175 mole) of 2-ethylaminoethanol is dissolved in 30 ml. of abs. methylene chloride. To this solution is added dropwise at −5° to 0°, in the course of 45 minutes, a solution of 20.9 g. (0.175 mole) of 3-chloropropyl)-isocyanate in 20 ml. of abs. methylene chloride. The reaction mixture is stirred for 2 hours at 30°, and then cooled to 0°. To the cooled solution containing the crude 1-ethyl-1-(2-hydroxyethyl)-3-(3-chloropropyl)-urea is added dropwise, in the course of 30 minutes, a solution of 21.9 g. (0.182 mole) of thionyl chloride in 20 ml. of abs. methylene chloride. The reaction mixture is afterwards refluxed for 4 hours, and concentrated in vacuo. The obtained residue: crude 1-ethyl-1-(2-chloroethyl)-3-(3-chloropropyl)-urea, is dried under high-vacuum at 70–80°; yield 42.0 g. of crude product, which correspond to 39.8 g. (100% of the theoretical value) of pure compound.

(c) With the exclusion of moisture and whilst thorough stirring is maintained, 42.0 g. of the crude urea derivative (obtained according to (b) containing 39.8 g. (0.175 mole) of pure compound are heated for 3 hours in a bath at 120°, and afterwards for 6 hours in a bath at 140°. The obtained crude 1 - (3-chloropropyl)-3-ethyl-2-imidazolidinone is distilled under high-vacuum; B.P. 101–103°/0.01 Torr ($n_D^{24}$:1.4868); yield 28.1 g., 84.5% of the theoretical value.

EXAMPLE 3

(a) An amount of 11.9 g. (0.049 mole) of 8-methyl-10-chloro-10,11-dihydro-5H-dibenzo[a,d]cycloheptene is dissolved in 50 ml. of abs. benzene; this solution is then added dropwise at room temperature to a solution of 15.6 g. (0.073 mole) of 1-[2-(1-piperazinyl)-ethyl]-3-methyl-2-imidazolidinone in 30 ml. of abs. benzene; and the reaction mixture is refluxed for 20 hours. The cooled solution is poured on to 200 ml. of ice water; to this are added 20 ml. of 2-n sodium hydroxide solution, and the organic phase is separated. The organic phase is washed with water, and extracted with 150 ml. of 1-n methanesulphonic acid solution. The pH of the aqueous extract is adjusted with concentrated sodium hydroxide solution to 13. The precipitated crude base is extracted with benzene; the benzene solution is washed with water, dried over magnesium sulphate, and concentrated in vacuo. The residue is recrystallized from ethyl acetate/petroleum ether. The obtained pure 1-[2-[4-(8-methyl-10,11-dihydro - 5H - dibenzo[a,d]cyclohepten-10-yl)-1-piperazinyl]-ethyl]-3-methyl-2-imidazolidinone melts at 116–117°.

The 8-methyl-10-chloro-10,11-dihydro - 5H - dibenzo[a,d]cycloheptene required as starting material is produced as follows:

(b) An amount of 11.2 g. (0.05 mole) of 8-methyl-10,11 - dihydro - 5H - dibenzo[a,d]cyclohepten-10-ole is dissolved in 50 ml. of abs. benzene; to the solution are then added 5.14 g. (0.065 mole) of pyridine. To this solution is then added dropwise at 5° a solution of 7.14 g. (0.06 mole) of thionyl chloride in 25 ml. of abs. benzene. The reaction mixture is stirred, whilst nitrogen is fed in, for 5 hours at 50°; it is afterwards poured into 200 ml. of ice water. The mixture is extracted with ether/methylene chloride (2:1). The ether/methylene chloride solution is washed with 1-n hydrochloric acid, 1-n sodium hydrogen carbonate solution, and water; it is then dried over magnesium sulphate, and concentrated in vacuo. The crystalline residue: 8 - methyl-10-chloro-10,11-dihydro-5H-dibenzo[a,d]cycloheptene, melts at 65–68°; yield 11.3 g., 93% of the theoretical value.

EXAMPLE 4

An amount of 2.92 g. (0.01 mole) of 8-methyl-10-(1-piperazinyl)-10,11-dihydro-5H-dibenzo[a,d]cycloheptene is refluxed with 2.80 g. (0.014 mole) of crude 1-methyl-3,3-bis-(2-chloroethyl)-urea and 3.6 g. (0.026 mole) of anhydrous potassium carbonate in 36 ml. of diethyl ketone for 12 hours. A further 2.4 g. (0.018 mole) of potassium carbonate are added after 4 hours reaction time, and the same amount is again added after 8 hours reaction time. The reaction mixture is cooled, diluted with ether, filtered, and the filtrate concentrated in vacuo. The residue (5.22 g.) is taken up in ether; the solution is then extracted with 1-n hydrochloric acid, the acidified extract washed with ether, and excess sodium carbonate added. The precipitated free base is taken up in ether; the ether solution is then washed with water, dried over sodium sulphate, and concentrated by evaporation. The residue is chromatographed on a column of silica gel (Merck®, grain size 0.05–0.2 mm.), which has been impregnated with 0.5-n sodium hydroxide solution. Chloroform is used as the eluting agent. The fractions containing the crude product are concentrated by evaporation. The residue is recrystallized from ethyl acetate/petroleum ether, whereupon the pure 1 - [2 - [4-(8-methyl-10,11-dihydro-5H-dibenzo[a,d]cyclohepten - 10-yl)-1-piperazinyl]-ethyl]-3-methyl-2-amidazolidinone melts at 116–117°, yield 2.72 g., 65% of the theoretical value.

EXAMPLE 5

Analogously to Example 1a the following end products are obtained:

(a) From 31.2 g. (0.1 mol) of 8-chloro-10-(1-piperazinyl)-10,11-dihydro-5H-dibenzo[a,d]cycloheptene and 17.8 g. (0.11 mol) of 1-(2-chloroethyl)-3-methyl-2-imidazolidinone, the 1-[2-[4-(8-chloro-10,11-dihydro-5H-dibenzo[a,d]cyclohepten - 10 - yl)-1-piperazinyl]-ethyl]-3-methyl-2-imidazolidinone, M.P. 134–135°; Yield: 33.6= 75% of the theoretical value.
M.P. of the bis-methanesulphonate, 1⅓ hydrate: 180°–181° (from ethanol-diethylether).

(b) From 31.2 g. (0.1 mol) of 8-chloro-10-(1-piperazinyl)-10,11-dihydro-5H-dibenzo[a,d]cycloheptene and 20.9 g. (0.11 mol) of 1-(3-chloropropyl)-3-ethyl-2-imidazolidinone, the crude 1-[3-[4-(8-chloro-10,11-dihydro-5H - dibenzo[a,d]cyclohepten-10-yl)-1-piperazinyl]-propyl]-3-ethyl-2-imidazolidinone, the bis-maleate of which [prepared according to Example 1a)] melts at 113–115°.

(c) From 31.2 g. (0.1 mol) of 8-chloro-10-(1-piperazinyl)-10,11-dihydro-5H-dibenzo[a,d]cycloheptene and 24.0 g. (0.11 mol) of 1-(3-chloropropyl)-3-butyl-2-imidazolidinone, the crude 1-[3-[4-(8-chloro-10,11-dihydro-5H - dibenzo[a,d]cyclohepten - 10-yl)-1-piperazinyl]-propyl]-3-butyl-2-imidazolidinone. Yield: 35.6 g.=73% of the theoretical value.

The product is an oily compound, which is dissolved in acetone, to which an ethereal solution of hydrochloric acid is added until congo-acid reaction sets in. A solid precipitates which is filtered by suction and recrystallized from ethanol/ethylacetate containing a small amount of diethylether, whereby the pure 1-[3-[4-(8-chloro-10,11-dihydro-5H-dibenzo[a,d] cyclohepten-10-yl)-1-piperazinyl]-propyl]-3-butyl-2-imidazolidinone-dihydrochloride is obtained as a two-third hydrate. M.P. 195–197°.

The 1 - (3-chloropropyl)-3-butyl-2-imidazolidinone required as starting material may be prepared by the following procedure:

(d) 19.6 g. (0.175 mol) of 2-butylamino-ethanol are dissolved in 30 ml. of absolute methylene chloride to which solution are dropped, at a temperature of from −5° to 0°, a solution of 20.9 g. (0.175 mol) of (β-chloropropyl)-isocyanate in 20 ml. of absolute methylenechloride in the course of 45 minutes. The reaction mixture is stirred at 30° for 2 hours and then cooled to 0°. Into the cooled solution containing the crude 1-butyl-1-(2-hydroxyethyl)-3-(3-chloropropyl)-urea, a mixture of 21.9 g. (0.182 mol) of thionylchloride in 20 ml. of absolute methylene-chloride is dropped in the course of 30 minutes. The reaction mixture is then refluxed for 4 hours followed by evaporation under a vacuum. The residue which represents the crude 1-butyl-1-(2-chloroethyl)-3-(3-chloropropyl)-urea is dried at 70–80° in a high vacuum, then heated in a bath at 120° for 3 hours, followed by heating in a bath at 140° for 6 hours. The crude product is then distilled in a high vacuum. B.P. 110–112°/0.05 Torr.

EXAMPLE 6

Analogously to Example 1a the following final products may be prepared:

(a) From 27.8 g. (0.1 mol) of 10-(1-piperazinyl)-10,11-dihydro-5H-dibenzo[a,d]cycloheptene and 17.8 g. (0.11 mol) of 1 - (2-chloroethyl)-3-methyl-2-imidazolidinone, the 1-[2-[4-(10,11-dihydro-5H-dibenzo[a,d]cyclohepten-10 - yl)-1-piperazinyl]-ethyl]-3-methyl-2-imidazolidinone. M.P. 117–118°; Yield: 34.3 g.=85% of the theoretical value. The mono-maleate (from ethanol/diethylether) melts at 172–173°.

(b) From 27.8 g. (0.1 mol) of 10-(1-piperazinyl)-10,11-dihydro-5H-dibenzo[a,d]cycloheptene and 22.4 g. (0.11 mol) of 1-(2-chloroethyl)-3-butyl-2-imidazolidinone, the 1 - [2-[4-(10,11-dihydro-5H-dibenzo[a,d]cyclohepten-10-yl) -1-piperazinyl]-ethyl]-3-butyl-2-imidazolidinone. M.P. 86–87°. Yield: 34.0 g.=76% of the theoretical value. The mono-maleate (from ethanol/diethylether) melts at 133–134°.

(c) From 27.8 g. (0.1 mol) of 10-(1-piperazinyl)-10,11-dihydro - 5H-dibenzo[a,d]cycloheptene and 20.9 g. (0.11 mol) of 1-(3-chloropropyl)-3-ethyl-2-imidazolidine, the crude 1 - [3-[4-(10,11-dihydro-5H-dibenzo[a,d]cyclohepten - 10-yl]-1-piperazinyl]-propyl]-3-ethyl-2-imidazolidinone. Yield: 33.7 g.=78% of the theoretical value. The bis-maleate .1½ hydrate prepared analogously to Example 1a melts at 104–106°.

EXAMPLE 7

Analogously to Example 1a, the following end products may be prepared:

(a) From 30.8 g. (0.1 mol) of crude 8-methoxy-10-(1 - piperazinyl) - 10,11-dihydro-5H-dibenzo[a,d]cycloheptene and 17.8 g. (0.11 mol) of 1-(2-chloro-ethyl)-3-methyl-2-imidazolidinone, the 1-[2-[4-(8-methoxy-10,11-dihydro - 5H - dibenzo[a,d]cyclohepten-10-yl)-1-piperzinyl]-ethyl]-3-methyl-2-imidazolidinone. M.P. 122–123° (from ethyl acetate/ petroleum ether). ɜield: 30.4 g. =70% of the theoretical value. The bis-maleate (from absolute ethanol/diethylether) melts at 144–146°.

(b) From 30.8 g. (0.1 mol) of crude 8-methoxy-10-(1 - piperazinyl) - 10,11-dihydro-5H-dibenzo[a,d]cycloheptene and 19.4 g. (0.11 mol) of 1-(3-chloropropyl)-3-methyl-2-imidazolidinone, the crude 1-[3-[4-(8-methoxy-10,11 - dihydro - 5H - dibenzo[a,d]cyclohepten-10-yl)-1-piperazinyl]-1-propyl]-3-methyl-2-imidazolidinone. Yield: 22.8 g.=62% of the theoretical value. The bis-maleate. ¾ hydrate (from absolute ethanol) melts at 106–108°.

(c) The 8 - methoxy-10-(1-piperazinyl)-10,11-dihydro-5H-dibenzo[a,d]cycloheptene required as starting material may be obtained by the following procedure:

48.0 g. (0.2 mol) of 8-methoxy-10-hydroxy-5H-dibenzo[a,d]cycloheptene are dissolved in 200 ml. of chloroform, 20.7 g. (0.26 mol) of pyridine are added to which solution, in the course of 45 minutes at 0–5°, a solution of 28.4 g. (0.24 mol) of thionylchloride in 100 ml. of benzene are dropped. The reaction mixture is stirred at 45–50° for 2 hours whilst nitrogen gas is fed in and subsequently poured into ½ litre of ice-water.

After adding an amount of methylenechloride the organic layer is separated and subsequently washed with 200 ml. of each 1-n. hyrdrochloric acid, water, saturated aqueous sodium hydrogencarbonate solution and finally with water. The organic layer is separated, dried over magnesium sulphate and evaporated in vacuo, whereby the 8 - methoxy-10-chloro-10,11-dihydro-5H-dibenzo[a,d] cycloheptene is obtained. M.P. 84–86°.

(d) 25.8 g. (0.1 mol) of the compound as prepared under (c) are refluxed together with 42.4 g. (0.3 mol) of 1-piperazine carboxylic acid ethyl ester in 200 ml. of benzene for 24 hours. The mixture is then poured into 500 ml. of ice-water, 50 ml. of 2-n. sodium hydroxide solution are added, and the benzene layer is separated. The aqueous phase is extracted with benzene, the combined benzene phases are washed with water, dried over magnesium sulphate and evaporated in vacuo, whereby an oily residue is obtained. 38.0 g. of this crude product are dissolved in 100 ml. of absolute ethanol and after adding 20.0 g. (0.358 mol) of potassium hydroxide refluxed for 20 hours. The solution is then evaporated in vacuo and to the residue 200 ml. of each benzene, and water, are added. The benzene layer is washed with water to neutral and extracted with 200 ml. of 2-n. hydrochloric acid, then the acid phase is rendered alkaline by means of concentrated sodium hydroxide solution, whereby a solid precipitates, which is extracted with benzene. The combined benzene extracts are thoroughly washed with water, dried over magnesium sulphate and evaporated in vacuo to dryness.

The residue represents the 8 - methoxy-10-(1-piperazinyl)-10,11-dihydro-5H-dibenzo[a,d]cycloheptene and is used in crude state for the subsequent reaction. Yield: 10.8 g.=35% of the theoretical value.

EXAMPLE 8

(a) Analogously to Example 1a, 30.8 g. (0.01 mol) of crude 8 - methoxy-10-(1-piperazinyl)-10,11-dihydro-5-H-dibenzo[a,d]cycloheptene, obtained according to Example 7c and d respectively, and 21.0 g. (0.11 mol of 1-(2 - chloroethyl)-isopropyl-2-imidazolidinone are reacted to produce 1-[2-[4-(8-methoxy-10,11-dihydro-5H-dibenzo [a,d]cyclohepten - 10 - yl) - 1-piperazinyl]-ethlyl]-3-isopropyl - 2-imidazolidinone. Yield. 35.6 g.=77% of the theoretical value. M.P. of the bis-maleate. ¾ hydrate (from absolute ethanol/diethylether): 125–127°.

The 1 - (2-chloroethyl)isopropyl-2-imidazolidinone required as starting material may be obtained by the following procedure:

(b) 105.1 g. (1.0 mol) of freshly distilled diethanolamine are dissolved in 1000 ml. of absolute methylenechloride to which solution, in the course of 1 hour, a solution of 89.5 g. (1.05 mols) of isopropylisocyanate at a temperature of 0–5° is dropped. The reaction mixture is refluxed for 1 hour whilst stirring. After cooling to 0°, a solution of 250.0 g. (2.1 mols) of thionylchloride in 250 ml. of absolute methylenechloride is added dropwise at 0–5°, in the course of 1 hour. After refluxing for 4 hours the mixture is evaporated in vacuo. The residue which represents the crude 1-isopropyl-3,3-bis-(2-chloroethyl)-urea is heated during 3 hours at 120° with exclusion of moisture, followed by heating to 140° for 6 hours.

The product is fractionated in a high vacuum, whereby the pure 1-(2-chloroethyl)-3-isopropyl-2-imidazolidinone distills at 88–90°/0.02 Torr; $n_D^{24}$=1.4855.

EXAMPLE 9

Analogously to Example 1a the following end products are obtained:

(a) from 29.2 g. (0.1 mol) of crude 5-methyl-10-(1-piperazinyl) - 10,11 - dihydro - 5H - dibenzo[a,d]cycloheptene and 17.8 g. (0.11 mol) of 1-(2-chloroethyl)-3-methyl - 2 - imidazolidinone, the crude 1-[2-[4-(5-methyl-10,11 - dihydro - 5H - dibenzo[a,d]cyclohepten-10-yl)-1-piperazinyl] - ethyl] - 3 - methyl - 2 - imidazolidinone. Yield: 32.6 g.=78% of the theoretical value. The dioxalate. ⅔ hydrate melts at 120–125° (precipitated from acetone/ethylacetate followed by recrystallization from acetone containing a small amount of an ethanol-diethylether mixture.

(b) from 29.2 g. (0.1 mol) of crude 5-methyl-10-(1-piperazinyl) - 10,11 - dihydro - 5H - dibenzo[a,d]cycloheptene and 19.4 g. (0.11 mol) of 1-(3-chloropropyl)-3-methyl - 2 - imidazolidinone, the crude 1-[3-[4-(5-methyl-10,11 - dihydro - 5H - benzo[a,d]cycloheptene - 10 - yl)-1 - piperazinyl]-propyl] - 3 - methyl - 2 - imidazolidinone. Yield: 35.2 g.=81.2% of the theoretical value. The pure oxalate melts at 162–165° precipitated from acetone/ethylacetate followed by recrystallization from an acetone/ethanol/diethylether mixture.

The 5 - methyl - 10 - (1 - piperazinyl) - 10,11 - dihydro-5H - dibenzo[a,d]cycloheptene is prepared in the following manner:

(c) 44.4 g. (0.2 mol) of 5-methyl - 10,11 - dihydro - 5H - dibenzo[a,d]cyclohepten - 10 - one are dissolved in 500 ml. of methanol to which solution, during refluxing, a solution of 7.55 g. (0.2 mol) of sodium borohydride in 80 ml. of water is dropped in the course of 40 minutes. Refluxing is then continued for 2 hours followed by evaporating the solvent in vacuo. The residue is poured into 200 ml. of ice-water and this mixture is triturated with a 1-n. sodium-dihydrogenphosphate solution and 1-n. hydrochloric acid until pH 7 is reached. The solution obtained is extracted with a diethylether/methylenechloride mixture (2:1), the organic layers washed with water, dried over magnesium sulphate and evaporated in vacuo. The residue thus obtained is recrystallized from benzene/petroleum ether, whereby the pure 5-methyl-10-hydroxy-10,11-dihydro-dibenzo[a,d]cycloheptene is obtained. M.P. 89–90°; Yield: 90% of the theoretical value.

(d) 40.3 g. (0.18 mol) of the compound prepared under (c) are dissolved in 200 ml. of chloroform, together with 18.9 g. (0.234 mol) of pyridine to which solution, at a temperature of 0–5°, a solution of 25.6 g. (0.216 mol) of thionylchloride in 100 ml. of benzene is dropped. The reaction mixture is fed with nitrogen gas whilst stirring at 45–50° for 2 hours, followed by pouring into 500 ml. of ice-water. Methylene chloride is added and the organic layer is separated and subsequently washed with 200 ml. of each of 1-n. hydrochloric acid, water, saturated sodium hydrogencarbonate solution and water until pH 7 is reached. The organic layers are dried over magnesium sulphate and the solvents volatilized in vacuo at 45°. The oily residue represents the 5-methyl - 10 - chloro - 10,11-dihydro - 5H - dibenzo[a,d]cycloheptene which is used for the subsequent reaction. Yield: 43.5 g.=quantitative.

(e) 43.5 g. (0.18 mol) of this crude product and 85.5 g. (0.54 mol) of 1-piperazine carboxylic acid ethyl ester are dissolved in 400 ml. of benzene and refluxed for 20 hours. After cooling, the mixture is poured into 500 ml. of ice-water, 100 ml. of 2-n. sodium hydroxide solution are added, the benzene layer is separated and the aqueous phase is extracted with benzene. The combined benzene extracts are washed with water, dried over magnesium sulphate and the solvent evaporated in vacuo, yielding an oily residue.

66.0 g. of this product are dissolved in 200 ml. of absolute ethanol and after adding 40.0 g. of potassium hydroxide, the reaction mixture is refluxed for 20 hours, followed by filtration of the warm reaction mixture from precipitated potassium carbonate. The filter-residue is washed with warm ethanol and the combined filtrates are concentrated to syrupy consistence, to which 300 ml. of each of benzene and water are added. The benzene layer is separated, washed with water to neutral reaction, followed by extraction with 400 ml. of 2-n. hydrochloric acid. The acid solution is rendered alkaline by adding concentrated sodium hydroxide solution, which is then extracted with benzene. The combined benzene layers are washed with water, dried over magnesium sulphate and evaporated in vacuo to dryness.

The residue represents the 5-methyl-10-(1-piperazinyl)-10,11 - dihydro - 5H - dibenzo[a,d]cycloheptene in crude state. Yield: 52.5 g.=40% of the theoretical value.

EXAMPLE 10

Analogously to Example 1a the following end products are obtained;

(a) From 30.6 g. (0.1 mol) of crude 5,8 - dimethyl-10 - (1 - piperazinyl) - 10,11 - dihydro - 5H - dibenzo[a,d]cycloheptene and 17.8 g. (0.11 mol) of 1-(2-chloroethyl) - 3 - methyl - 2 - imidazolidinone, the crude 1-[2-[4-(5,8 - dimethyl - 10,11 - dihydro - 5H - dibenzo[a,d]cyclohepten - 10 - yl) - 1 - piperazinyl]-ethyl]-3-methyl-2-imidazolidinone. Yield: 30.2 g.=70% of the theoretical value. The dioxalate .⅔ hydrate (precipitated from acetone/diethylether is recrystallized from ethyl acetate containing a small amount of an ethanol/diethylether mixture) melts at 162–168°.

(b) From 30.6 g. (0.1 mol) of crude 5,8-dimethyl-10-(1 - piperazinyl) - 10,11 - dihydro - 5H - dibenzo[a,d]cycloheptene and 19.4 g. (0.11 mol) of 1-(3-chloropropyl)-3 - methyl - 2 - imidazolidinone, the crude 1-[3-[4-(5,8-dimethyl - 10,11 - dihydro - 5H - dibenzo[a,d]cyclohepten - 10 - yl) -1 - piperazinyl]-propyl] - 3 - methyl-2-imidazolidinone. Yield: 32.2 g.=72% of the theoretical value. The dioxalate. ⅔ hydrate melts at 198–200°.

The crude 5,8 - dimethyl - 10 - (1 - piperazinyl) - 10,11-dihydro - 5H - dibenzo[a,d]cycloheptene required as starting material may be prepared analogously to Example 9c–e from 5,8 - dimethyl - 10,11 - dihydro - 5H - dibenzo-[a,d]cyclohepten - 10 - one (M.P. 99° from diethylether) via the following intermediate compounds:

(c₁) 5,8 - dimethyl - 10 - hydroxy - 10,11 - dihydro-5H-dibenzo[a,d]cycloheptene; M.P. 87–94° (from methylcyclohexane/pentane), (c₂) 5,8 - dimethyl - 10 - chloro - 10,11 - dihydro - 5H-dibenzo[a,d]cycloheptene as crude product.

EXAMPLE 11

Analogously to Example 4 the following final products are obtained:

(a) From 3.1 g. (0.01 mol) of 8-chloro-10-(1-piperazinyl)-10,11-dihydro-5H-dibenzo[a,d]cycloheptene and 2.80 g. (0.014 mol) of 1-methyl-3,3-bis-(2-chloroethyl)-urea, the 1-[2-[4-(8-chloro-10,11-dihydro-5H-dibenzo[a,d]cyclohepten-10-yl) - 1 - piperazinyl]ethyl]-3-methyl-2-imidazolidinone. M.P. 134–135°; Yield: 2.4 g.=60% of the theoretical value.

(b) From 2.7 g. (0.01 mol) of 10-(1-piperazinyl)-10,11-dihydro-5H-dibenzo[a,d]cycloheptene and 2.80 g. (0.014 mol) of 1-methyl-3,3-bis-(2-chloroethyl)-urea, the 1-[2-[4-(10,11-dihydro - 5H - dibenzo[a,d]cyclohepten-10-yl)-1-piperazinyl]-ethyl]-3 - methyl-2-imidazolidinone.

M.P. 117–118°; Yield: 2.82 g.=70% of the theoretical value.

(c) From 3.08 g. (0.01 mol) of crude 8-methoxy-10-(1-piperazinyl)-10,11-dihydro - 5H - dibenzo[a,d]cycloheptene and 2.80 g. (0.014 mol) of 1-methyl-3,3-bis-(2-chloroethyl)-urea, the 1-[2-[4-(8-methoxy-10,11-dihydro-5H-dibenzo[a,d]-cyclohepten - 10-yl)-1-piperazinyl]-ethyl]-3-methyl-2-imidazolidinone. M.P. 122–123° (from ethylacetate/petroleum ether). Yield: 2.95 g.=68% of the theoretical value.

(d) From 2.92 g. (0.01 mol) crude 5-methyl-10-(1-piperazinyl)-10,11-dihydro - 5H - dibenzo[a,d]cycloheptene and 2.8 g. (0.014 mol) of 1-methyl-3,3-bis-(2-chloroethyl)-urea, the crude 1-[2-[4-(5-methyl-10,11-dihydro-5H-dibenzo[a,d]cyclohepten - 10-yl)-1-piperazinyl]-ethyl]-3-methyl-2-imidazolidinone, which is converted by oxalic acid into the di-oxalate. ⅔ hydrate. M.P. 120–125° from ethylacetate/ethanol/diethylether.

(e) From 3.06 g. (0.01 mol) of 5,8-dimethyl-10-(1-piperazinyl)-10,11-dihydro - 5H - dibenzo[a,d]cycloheptene and 2.80 g. (0.014 mol) of 1-methyl-3,3-bis-(2-chloroethyl)-urea, the crude 1-[2-[4-(5,8-dimethyl-10,11-dihydro-5H-dibenzo[a,d]cyclohepten - 10-yl)-1-piperazinyl]-ethyl]-3-methyl-2-imidazolidinone, the oxalate. ⅔ hydrate of which melts at 162–168°.

EXAMPLE 12

Analogously to Example 4 the following end product is obtained:

(a) From 3.08 g. (0.01 mol) crude 8-methoxy-10-(1-piperazinyl)-10,11 - dihydro-5H - dibenzo[a,d]cycloheptene and 3.18 g. (0.014 mol) of 1-isopropyl-3,3-bis-(2-chloroethyl)-urea, the 1-[2-[4-(8-methoxy-10,11-dihydro-5H-dibenzo[a,d]cyclohepten-10-yl) - 1 - piperazinyl]-ethyl]-3-isopropyl-2-imidazolidinone. Yield: 2.92 g. The bis-maleate. ¾ hydrate (precipitated from an acetone/diethylether solution followed by recrystallization from ethanol/diethylether) melts at 125–127°.

The 1-isopropyl-3,3-bis-(2-chloro-ethyl)-urea required as starting material is prepared by the following method:

(b) To a solution of 10.5 g. (0.1 mol) of freshly distilled diethanol amine in 100 ml. of absolute methylenechloride a solution of 8.95 g. (0.105 mol) of isopropylcyanate in 20 ml. of absolute methylene chloride is dropped, at a temperature of 0–5° in the course of 30 minutes, followed by stirring each for one hour at ambient temperature and then by refluxing. After cooling to 0°, a solution of 25.0 g. (0.21 mol) of thionylchloride in absolute methylenechloride at a temperature of 0–5° is added dropwise and then the mixture is refluxed for 4 hours, evaporated in vacuo to dryness and dried at 40° in a high vacuum. The 1-isopropyl-3,3-bis-(2-chloroethyl)-urea is obtained as an oily product.

EXAMPLE 13

Analogously to Example 4 the following end product is obtained:

(a) From 2.7 g. (0.01 mol) of 10-(1-piperazinyl)-10,11-dihydro-5H-dibenzo[a,d]cycloheptene and 3.37 g. (0.014 mol) of 1-butyl-3,3-bis-(2-chloroethyl)-urea, the 1-[2-[4-(10,11-dihydro - 5H - dibenzo[a,d]cyclohepten-10-yl)-1-piperazinyl]-ethyl] - 3-butyl-2-imidazolidinone. M.P. 86–87° (from ethylacetate/petroleum ether); Yield: 2.99 g.=62% of the theoretical value.

The 1-butyl-3,3-bis-(2-chloroethyl)-urea is prepared analogously to Example 12b.

(b) From 10.5 g. (0.1 mol) of freshly distilled diethanolamine, 10.4 g. (0.105 mol) of butylisocyanate and 25.0 g. (0.21 mol) of thionylchloride. The 1-butyl-3,3-bis-(2-chloroethyl)-urea is obtained as an oily product which is used for subsequent reaction.

EXAMPLE 14

Analogously to Example 3a the following final products are prepared:

(a) From 13.2 g. (0.05 mol) of 8,10-dichloro-10,11-dihydro-5H-dibenzo[a,d]cycloheptene and 15.9 g. (0.075 mol) of 1-[2-(1-piperazinyl)-ethyl]-3-methyl-2-imidazolidinone, the 1-[2-[4-(8-chloro-10,11-dihydro-5H-dibenzo[a,d]cyclohepten-10-yl)-1-piperazinyl]-ethyl] - 3-methyl-2-imidazolidinone. M.P. 134–135°; Yield: 6.55 g.=30% of the theoretical value. The bis-methanesulphonate. 1⅓ hydrate melts at 180–181° (from ethanol/diethylether).

(b) From 11.4 g. (0.05 mol) of 10-chloro-10,11-dihydro-5H-dibenzo[a,d]cycloheptene and 15.9 g. (0.075 mol) of 1-[2-(1-piperazinyl) - ethyl]-3-methyl-2-imidazolidinone, the 1-[2-[4-(10,11 - dihydro-5H-dibenzo[a,d]cyclohepten-10-yl)-1-piperazinyl] - ethyl - 3-methyl-2-imidazolidinone. M.P. 112–118°; Yield: 9.3 g.=46% of the theoretical value. The mono-maleate melts at 122–123° (from ethanol/diethylether).

(c) From 12.9 g. (0.05 mol) of crude 8-methoxy-10-chloro-10,11-dihydro - 5H - dibenzo[a,d]cycloheptene and 15.9 g. (0.075 mol) of 1-[2-(1-piperazinyl)-ethyl]-3-methyl-2-imidazolidinone, the 1-[2-[4-(8-methoxy-10,11-dihydro-5H-dibenzo[a,d]cyclohepten - 10 - yl) - 1 - piperazinyl]-ethyl]-3-methyl-2-imidazolidinone. M.P. 122–123°; Yield: 8.7 g.=48% of the theoretical value. The bis-maleate melts at 144–146° (from ethanol/diethylether).

(d) From 13.2 g. (0.05 mol) of 8,10-dichloro-10,11-dihydro - 5H - dibenzo[a,d]cycloheptene and 18.0 g. (0.075 mol) 1-[3-(1-piperazinyl)-propyl]-3-ethyl-2-imidazolidinone, the crude 1-[3-[4-(8-chloro-10,11-dihydro-5H-dibenzo[a,d]-cyclohepten - 10 - yl) - 1 - piperazinyl]-propyl] - 3 - ethyl-2-imidazolidine. Yield: 7.7 g.=33% of the theoretical value. The bis-maleate melts at 113–115° (from absolute ethanol/diethylether).

(e) From 11.4 g. (0.05 mol) of 10-chloro-10,11-dihydro-5H-dibenzo[a,d]cycloheptene and 18.0 g. (0.075 mol) of 1-[3-(1-piperazinyl)-propyl] - 3 - ethyl-2-imidazolidinone, the crude 1-[3-[4-(10,11-dihydro-dibenzo[a,d]cyclohepten-10-yl) - 1 - piperazinyl]-propyl]-3-ethyl-2-imidazolidinone. Yield: 10.4 g.=48% of the theoretical value. The bis-maleate. ½ hydrate melts at 104–106° (from acetone and a small amount of ethanol/diethylether).

(f) From 12.9 g. (0.05 mol) of 8-methoxy-10-chloro-10,11-dihydro-5H-dibenzo[a,d]cycloheptene and 17.0 g. (0.075 mol) of 1-[3-(1-piperazinyl)-propyl]-3-methyl-2-imidazolidinone, the crude 1-[3-[4-(8-methoxy-10,11-dihydro - 5H - dibenzo[a,d]-cyclohepten - 10 - yl)-1-piperazinyl]-propyl]-3-methyl-2-imidazolidinone. Yield: 9.65 g.=43% of the theoretical value. The bis-maleate. ¾ hydrate melts at 106–108° (from ethanol/diethylether).

(g) From 11.4 g. (0.05 mol) of 10-chloro-10,11-dihydro-5H-dibenzo[a,d]cycloheptene and 19.0 g. (0.075 mol) of 1-[2-(1-piperazinyl)-ethyl]-3-butyl-2-imidazolidinone, the 1-[2-[4-(10,11-dihydro-5H-dibenzo[a,d]cyclohepten-10-yl) - 1 - piperazinyl - ethyl]-3-butyl-2-imidazolidinone. M.P. 86–87° (from ethylacetate/petroleum ether). Yield: 8.9 g.=40% of the theoretical value.

EXAMPLE 15

Analogously to Example 3a the following end product is obtained:

(a) From 13.2 g. (0.05 mol) of 8,10-dichloro-10,11-dihydro-5H-dibenzo[a,d]cycloheptene and 20.1 g. (0.075 mol) of 1-[3-(1-piperazinyl)-propyl]-3-butyl-2-imidazolidinone, the crude 1-[3-[4-(8-chloro-10,11-dihydro-5H-dibenzo[a,d] - cyclohepten-10-yl)-1-piperazinyl]-propyl]-3-butyl-2-imidazolidinone. Yield: 7.65 g.=31% of the theoretical value. The dihydrochloride. ⅔ hydrate melts at 195–197° (from ethanol/ethylacetate/diethylether).

The 1-[3-(1-piperazinyl)-propyl]-3-butyl-2-imidazolidinone required as starting material is prepared by the following procedure:

(b) To a solution of 218.0 g. (1.0 mol) of 1-(3-chloropropyl)-3-butyl-2-imidazolidinone prepared according to Example 5d and 175.0 g. (1.1 mols) of 1-piperazine carboxylic acid ethyl ester in 1000 ml. of diethylketone are added 304.0 g. (2.0 mols) of potassium carbonate and the reaction mixture is refluxed for 24 hours, which mixture is then warm filtered. The residue is boiled two times with 500 ml. of chloroform and filtered. The combined filtrates are evaporated in vacuo to dryness and the oily residue is fractioned in a high-vacuum. The pure 1-[3-(4-ethoxycarbonyl - 1 - piperazinyl)-propyl]-3-butyl-2-imidazolidinone distills at 180–210°/0.01 torr; $n_D^{24}$ =1.4946. Yield: 266.0 g.=78% of the theoretical value.

(c) 340.4 g. (1.0 mol) of 1-[3-(4-ethoxycarbonyl)-1-piperazinyl)-propyl]-3-butyl-2-imidazolidinone are added to a solution of 300.0 g. of potassium hydroxide in 1500 ml. of absolute ethanol and the mixture is refluxed for 16 hours. The precipitate is filtered off and washed with warm ethanol. The combined filtrates are concentrated in vacuo and the residue is triturated with 1000 ml. of benzene and 300 ml. of water. The aqueous phase is separated, saturated with potassium carbonate and extracted four times with benzene.

The combined benzene solutions are dried over potassium carbonate and the solvent volatilized in vacuo. The residue is fractionated in a high-vacuum, whereby the pure 1 - [3-(1-piperazinyl)-propyl]-3-butyl-2-imidazolidinone distills at 145–150°/0.01 torr. $n_D^{24}$=1.5006; Yield: 250.0 g.=93% of the theoretical value.

EXAMPLE 16

Analogously to Example 3a the following end product is obtained:

(a) From 12.9 g. (0.05 mol) crude 8-methoxy-10-chloro-10,11-dihydro-5H-dibenzo[a,d]cycloheptene and 18.0 g. (0.075 mol) of 1-[2-(1-piperazinyl)-ethyl]-3-isopropyl-2-imidazolidinone, the crude 1-[2-[4-(8-methoxy-10,11-dihydro - 5H - dibenzo[a,d]-cyclohepten-10-yl) - 1 - piperazinyl]-ethyl]-3-isopropyl-2-imidazolidinone. Yield: 10.1 g.=44% of the theoretical value. The bis-maleate. ¾ hydrate melts at 125–127° (from absolute ethanol/diethylether).

The 1-[2-(1-piperazinyl)-ethyl] - 3 - isopropyl-2-imidazolidinone is prepared analogously to Example 15b and c.

(b) 190.6 g. (1.0 mol) of 1-(2-chloroethyl)-3-isopropyl-2-imidazolidinone [prepared according to Example 8b] are reacted with 175.0 g. (1.1 mols) of 1-piperazine carboxylic acid ethyl ester yielding 1-[2-(4-ethoxycarbonyl-1-piperazinyl)ethyl]-3-isopropyl - 2 - imidazolidinone as crude product which is subsequently fractionated in a high vacuum, whereby impurities distill over in the range of from 140–190°/0.01 Torr. The residue is then saponified and gives, finally, the 1-[2-(1-piperazinyl)-ethyl]-3-isopropyl-2-imidazolidinone. B.P. 150–155°/0.01 Torr; $n_D^{24}$=1.5034. Yield: 73% of the theoretical value.

EXAMPLE 17

Analogously to Example 3a the following end products are prepared:

(a) From 12.1 g. (0.05 mol) of crude 5-methyl-10-chloro - 10,11 - dihydro - 5H-dibenzo[a,d]cycloheptene [prepared according to Example 9d] and 15.9 g. (0.075 mol) of 1 - [2 - (1 - piperazinyl)-ethyl]-3-methyl-2-imadazolidinone, the crude 1 - [2 - [4 - (5 - methyl-10,11-dihydro - 5H - dibenzo[a,d]cyclohepten - 10yl)-1-piperazinyl] - ethyl] - 3 - methyl - 2 - imidazolidinone. Yield: 7.2 g.=37% of the theoretical value. The dioxalate. ⅔ hydrate melts at 120–125° (from ethyl acetate and a small amount of ethanol/diethylether).

(b) From 12.1 g. (0.05 mol) of crude 5-methyl-10-chloro - 10,11 - dihydro - 5H-dibenzo[a,d]cycloheptene [prepared according to Example 9d] and 17.0 g. (0.075 mol) of 1 - [3 - (1 - piperazinyl)-propyl]-3-methyl-2-imidazolidinone, the crude 1 - [3 - [4 - (5-methyl-10,11-dihydro - 5H - dibenzo[a,d]cyclohepten - 10 - yl)-1-piperazinyl]-propyl] - 3 - methyl - 2 - imidazolidinone. Yield: 7.55 g.=35% of the theoretical value. The dioxalate melts at 162–165° (from absolute ethanol/diethylether).

(c) From 12.8 g. (0.05 mol) of crude 5,8 - dimethyl-10-chloro - 10,11 - dihydro - 5H - dibenzo[a,d]cycloheptene and 15.9 g. (0.075 mol) of 1 - [2 - (1 - piperazinyl) - ethyl] - 3 - methyl-2-imidazolidinone, the crude 1 - [2 - [4 - (5,8 - dimethyl-10,11-dihydro-5H-dibenzo[a,d]cyclohepten - 10 - yl) - 1 - piperazinyl]-ethyl]-3-methyl-2-imidazolidinone. Yield: 6.9 g.=32% of the theoretical value. The dioxalate. ⅔ hydrate melts at 162–168° (from ethanol/ethylacetate/diethylether).

(d) From 12.8 g. (0.05 mol) of crude 5,8 - dimethyl-10 - chloro - 10,11 - dihydro - 5H - dibenzo[a,d]cycloheptene and 17.0 g. (0.075 mol) of 1 - [3 - (1-piperazinyl) - propyl] - 3 - methyl - 2 - imidazolidinone, the crude 1 - [3 - [4 - (5,8-dimethyl-10,11-dihydro-5H-dibenzo[a,d]cyclohepten - 10 - yl) - 1-piperazinyl]-propyl]-3 - methyl - 2 - imidazolidinone. Yield: 8.5 g.=38% of the theoretical value. The dioxalate. ⅓ hydrate melts at 198–200° (from a little absolute ethanol/ethylacetate/diethylether).

What is claimed is:

1. A pharmaceutical composition comprising central nervous system depressant amount of a compound of the formula

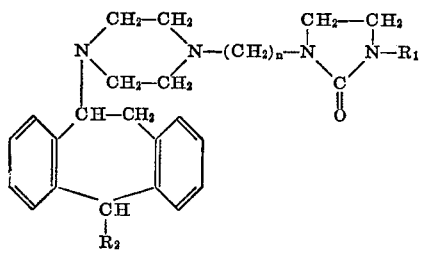

wherein

X is hydrogen, chloro, methyl or methoxy;
$R_1$ is alkyl having from one to four carbon atoms;
$R_2$ is hydrogen or methyl; and
$n$ is the integer 2 or 3;

and the pharmaceutically acceptable acid addition salt thereof or a pharmaceutical carrier therefor.

2. The composition of claim 1 with 1 - [2 - [4 - (8-methyl-10,11-dihydro - 5H - dibenzo[a,d]cyclohepten-10-yl)-1-piperazinyl]-ethyl] - 3 - methyl-2-imidazolidinone, and a pharmaceutically acceptable acid addition salt thereof.

3. The composition of claim 1 with 1 - [2 - [4-(8-chloro - 10,11 - dihydro - 5H - dibenzo[a,d]cyclohepten-10 - yl) - 1 - piperazinyl] - ethyl] - 3 - methyl-2-imidazolidinone, and a pharmaceutically acceptable acid addition salt thereof.

4. The method of producing a depressant effect on the central nervous system of a warm-blooded animal comprising administering to said animal central nervous system depressant amount of a compound according to claim 1.

References Cited

UNITED STATES PATENTS 3,699,107   10/1972   Schindler et al. _____ 424—250
3,707,562   12/1972   Schindler et al. _____ 424—250

FOREIGN PATENTS 1,093,910   12/1967   Great Britain.

STANLEY J. FRIEDMAN, Primary Examiner